(12) United States Patent
Hirano

(10) Patent No.: US 10,647,293 B2
(45) Date of Patent: May 12, 2020

(54) SECURITY SYSTEM, VEHICLE DEVICE, AND COMPUTER-READABLE NON-TRANSITORY STORAGE MEDIUM

(71) Applicant: DENSO CORPORATION, Kariya, Aichi-pref. (JP)

(72) Inventor: Chihiro Hirano, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/257,051

(22) Filed: Jan. 24, 2019

(65) Prior Publication Data

US 2019/0152434 A1 May 23, 2019

Related U.S. Application Data

(63) Continuation of application No. PCT/JP2017/020463, filed on Jun. 1, 2017.

(30) Foreign Application Priority Data

Jul. 29, 2016 (JP) .................................. 2016-149793

(51) Int. Cl.
- *B60R 25/23* (2013.01)
- *G06F 21/31* (2013.01)
- *B60R 25/24* (2013.01)
- *G07C 9/00* (2020.01)

(52) U.S. Cl.
CPC ............ *B60R 25/23* (2013.01); *B60R 25/241* (2013.01); *B60R 25/246* (2013.01); *G06F 21/31* (2013.01); *G07C 9/00039* (2013.01)

(58) Field of Classification Search
None
See application file for complete search history.

(56) References Cited

U.S. PATENT DOCUMENTS

| | | | |
|---|---|---|---|
| 8,656,485 B2 | 2/2014 | Mochizuki | |
| 8,768,565 B2* | 7/2014 | Jefferies | G07B 15/00 701/32.7 |
| 9,688,247 B1* | 6/2017 | Jayaraman | B60R 25/24 |
| 2019/0147674 A1* | 5/2019 | Choi | G07C 9/00103 705/5 |

FOREIGN PATENT DOCUMENTS

| | | |
|---|---|---|
| JP | H10187903 A | 7/1998 |
| JP | 2002229608 A | 8/2002 |
| JP | 2008005371 A | 1/2008 |
| JP | 2008276602 A | 11/2008 |
| JP | 2012141809 A | 7/2012 |
| JP | 2015214241 A | 12/2015 |

* cited by examiner

*Primary Examiner* — Carlos Garcia
(74) *Attorney, Agent, or Firm* — Harness, Dickey & Pierce, P.L.C.

(57) ABSTRACT

A security system unlocks a locked state, which limits a use of a vehicle device attached to a vehicle, by inputting a preset genuine password. The security system may generate key information by converting the genuine password based on a predetermined rule. The key information is used for generating an alternative password that unlocks the locked state instead of the genuine password. The security system may generate the alternative password based on the key information. The security system may unlock the locked state when the alternative password is input.

5 Claims, 4 Drawing Sheets

SECURITY SYSTEM, VEHICLE DEVICE, AND COMPUTER-READABLE NON-TRANSITORY STORAGE MEDIUM

CROSS REFERENCE TO RELATED APPLICATIONS

The present application is a continuation application of International Patent Application No. PCT/JP2017/020463 filed on Jun. 1, 2017, which designated the United States and claims the benefit of priority from Japanese Patent Application No. 2016-149793 filed on Jul. 29, 2016. The entire disclosures of all of the above applications are incorporated herein by reference.

TECHNICAL FIELD

The present disclosure relates to a security system, a vehicle device, and computer-readable non-transitory storage medium.

BACKGROUND

In a security system, a locked state limiting a use of a device is unlocked by inputting a preset password.

SUMMARY

A security system unlocks a locked state, which limits a use of a vehicle device attached to a vehicle, by inputting a preset genuine password. The security system may generate key information by converting the genuine password based on a predetermined rule. The security system may generate the alternative password based on the key information. The security system may unlock the locked state when the alternative password is input.

BRIEF DESCRIPTION OF DRAWINGS

The above and other objects, features and advantages of the present invention will become more apparent from the following detailed description made with reference to the accompanying drawings. In the drawings.

DETAILED DESCRIPTION

Figure 1:
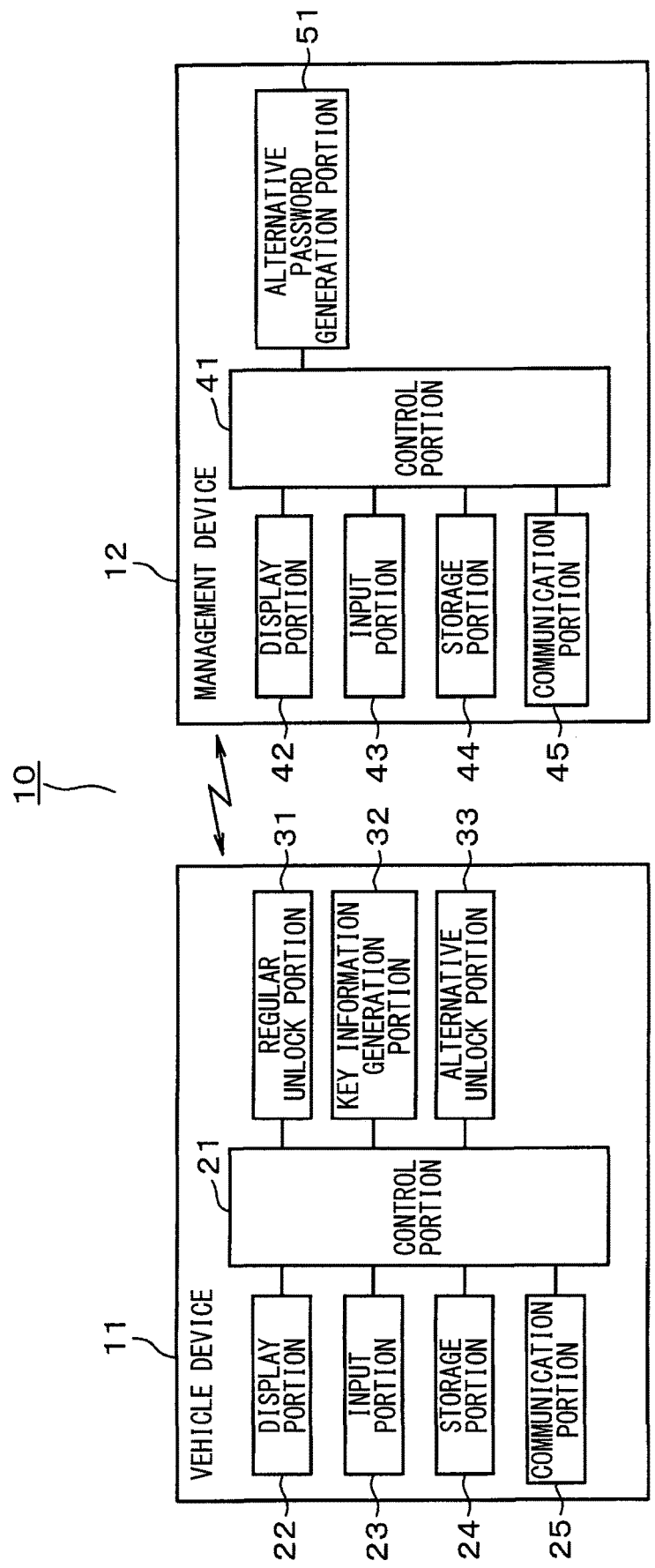
FIG. 1 is a diagram schematically showing an example configuration of a security system according to a first embodiment.

For example, when the password for a security system is forgotten, an unlock code is acquired by contacting a support center and the security system is unlocked using the unlock code.

The unlock code is referred to as an alternative password for unlocking the locked state instead of a genuine password. The alternative password is generated based on key information generated by the device.

The inventor has studied that the key information may be generated randomly. For example, power supply to the device may be turned off, and the generated key information may be cleared. In this case, when the power supply to the device is resumed, new key information is randomly generated. Although the new key information is generated, the alternative password is generated based on the key information cleared at the time of the turn off of the power supply to the device. In this configuration, the generated alternative password is differently corresponding to the new key information. Thus, the alternative password cannot unlock the locked state of the device.

The inventor has also studied that the key information may be fixed. In this method, the same alternative password is generated based on the same key information. In this configuration, once the alternative password is acquired, the locked state of the device can be unlocked using the alternative password. Thus, the method is unfavorable from the viewpoint of security.

An example embodiment of the present disclosure provides (i) a security system generating an alternative password that is capable of unlocking a locked state of a device even when key information is cleared, and improving security, (ii) a vehicle device constituting the security system, and (iii) computer-readable non-transitory storage medium storing a security program executed by the vehicle device.

In an example embodiment of the present disclosure, the key information for generating the alternative password is regularly generated based on the genuine password. Thus, when the key information is cleared, the same key information as the cleared key information can be generated and the alternative password corresponding to the new key information, that is, the alternative password that unlocks the locked state of the vehicle device can be generated. In addition, the key information is not fixed but generated again. With this configuration, the key information obtained in the past can be prevented from being used for many times. Thus, the configuration can improve security.

In an example embodiment of the present disclosure, a vehicle device constitutes a security system according to an example embodiment of the present disclosure. In an example embodiment of the present disclosure, computer-readable non-transitory storage medium storing a security program is executed by a vehicle device according to an example embodiment of the present disclosure. Thus, the vehicle device and the computer-readable non-transitory storage medium provide similar advantages to the security system according to an example embodiment of the present disclosure.

Hereinafter, multiple embodiments of a security system, a vehicle device, and computer-readable non-transitory storage medium will be described with reference to the drawings. In the following embodiments, substantially identical elements will be indicated by the same reference sign and the explanation thereof will not be skipped.

First Embodiment

A security system 10 illustrated in FIG. 1 includes a vehicle device 11 and a management device 12. The vehicle device 11 may be provided by a navigation device attached to a vehicle. The vehicle device 11 includes a control portion 21, a display portion 22, an input portion 23, a storage portion 24, and a communication portion 25, and the like. The control portion 21 may be mainly constituted by a microcomputer. The control portion 21 controls the entire operation of the vehicle device 11. The power supply from the power supply system of the vehicle to the vehicle device 11 may be turned off, and the power supply to the vehicle device 11 may be resumed. In this case, the control portion 21 sets the vehicle device 11 in a locked state that limits a use of the vehicle device 11. The power supply system of the vehicle may be provided by +B power supply, ACC power supply, or the like. The vehicle device 11 may be detached from the vehicle, and the vehicle device 11 may be attached to the same vehicle or another vehicle. In this case, the vehicle device is in the locked state that limits the use of the user.

The display portion 22 may be provided by a display. The display portion 22 displays various types of screens based on a display command signal received from the control portion 21. The input portion 23 may be provided by a mechanical operation switch, a touch panel switch on the screen of the display portion 22, or the like. When a user or a person in charge of dealer operates a switch, the input portion 23 transmits an operation signal corresponding to the operation content to the control portion 21.

The storage portion 24 may be provided by storage medium such as a ROM, a RAM or the like. The storage portion 24 stores a control program, control data, or the like for controlling the operation of the vehicle device 11. The control program is an example of the security program. The storage portion 24 stores a genuine password preset as a password for unlocking the locked state of the vehicle device 11. The storage portion 24 stores an alternative password obtained from the management device 12. The communication portion 25 may be provided by a communication module or the like. The communication portion 25 is connected to a device other than the vehicle device 11 such as the management device 12, and enables the vehicle device 11 to communicate with the device.

The control portion 21 virtually archives a regular unlock portion 31, a key information generation portion 32, and an alternative unlock portion 33 with software by executing the control program. Alternatively, in the control portion 21, these processing portions 31 to 33 may be achieved by hardware, or may be achieved by a combination of software and hardware.

The regular unlock portion 31 unlocks the locked state of the vehicle device 11 when the preset genuine password is input. The key information generation portion 32 generates key information for generating an alternative password that unlocks the lock state instead of the genuine password based on the genuine password. The alternative unlock portion 33 unlocks the locked state of the vehicle device 11 when the alternative password generated based on the key information generated by the key information generation portion 32 is input.

The management device 12 includes a control portion 41, a display portion 42, an input portion 43, a storage portion 44, a communication portion 45, and the like. The control portion 41 may be mainly constituted by a server computer. The control portion 41 controls the entire operation of the management device 12. The display portion 42 may be provided by a display. The display portion 42 displays various types of screens based on a display command signal input from the control portion 41. The input portion 43 may be provided by an input device, such as a keyboard, a mouse, or the like. The input portion 43 may transmit an operation signal corresponding to the operation content by the operator or the like to the control portion 41. The storage portion 44 may be provided by a storage medium such as a hard disk drive or the like. The storage portion 44 stores a control program, control data, or the like for controlling the operation of the management device 12. The communication portion 45 may be provided by a communication module or the like. The communication portion 45 is connected to a device other than the management device 12, such as the vehicle device 11 and enables the management device 12 to communicate with the device.

The control portion 41 virtually archives an alternative password generation portion 51 with software by executing the control program. In the control portion 41, the alternative password generation portion 51 may be achieved by hardware, or may be achieved by a combination of software and hardware.

The alternative password generation portion 51 generates the alternative password based on the key information generated by the key information generation portion 32. The alternative password generation portion 51 generates the alternative password by converting the key information using a conversion tool. The conversion tool converts a character string according to a predetermined algorithm. As the conversion tool, a commonly used well-known tool can be employed.

Figure 2:
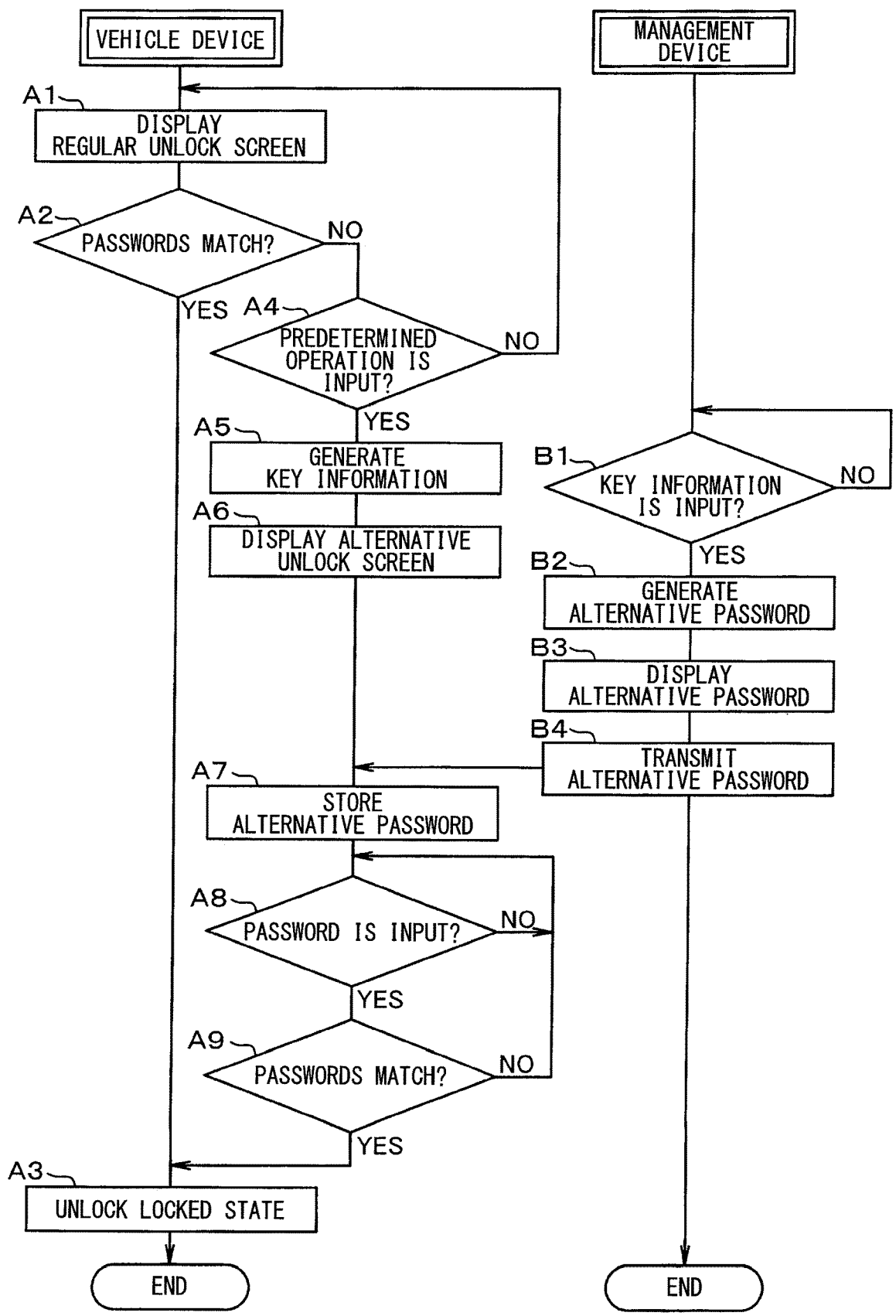
FIG. 2 is a flowchart showing an operation example of the security system.
Figure 3:
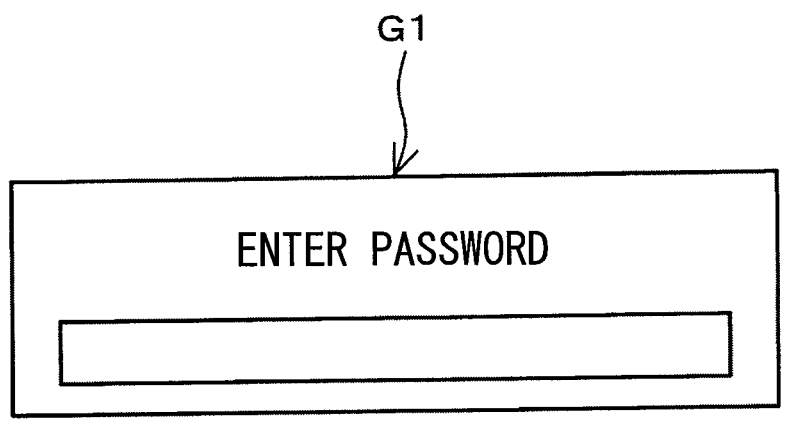
FIG. 3 is a diagram showing an example of a regular unlock screen.

Next, an operation example of the security system 10 will be described. As illustrated in FIG. 2, when entering the locked state, the vehicle device 11 displays a regular unlock screen G1 illustrated in FIG. 3 on the display portion 22 (A1). When a password is input on the regular unlock screen G1, the vehicle device 11 determines whether the input password matches the genuine password stored in the storage portion 24 (A2). When the input password matches the genuine password (A2: YES), the vehicle device 11 unlocks the locked state of the vehicle device 11 (A3, corresponding to a normal unlock processing). With this configuration, the vehicle device 11 is ready to be used by the user.

When the input password does not match the genuine password (A2: NO), the vehicle device 11 monitors whether a predetermined operation is input (A4). As the predetermined operation, for example, a special operation known only by the person in charge of dealer is set. When the predetermined operation is not input (A4: NO), the vehicle device 11 proceeds to A1. The vehicle device 11 may display a message indicating that the input password does not match the genuine password on the regular unlock screen G1.

Figure 4:
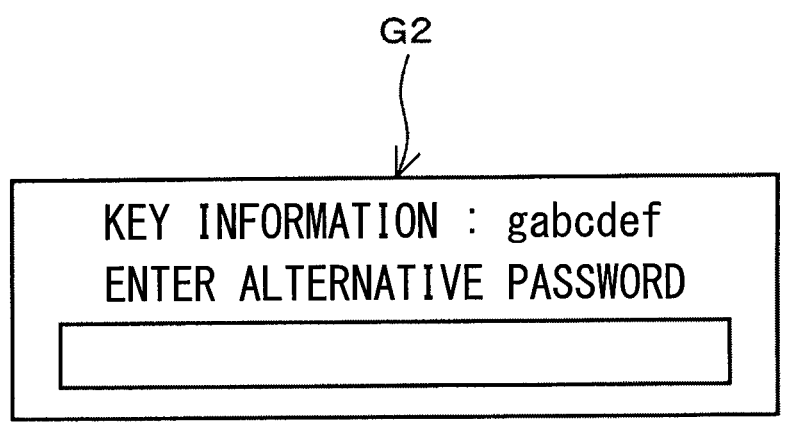
FIG. 4 is a diagram showing an example of an alternative unlock screen.

When the predetermined operation is input (A4: YES), the key information generation portion 32 of the vehicle device 11 generates the key information based on the genuine password (A5, corresponding to a key information generation processing). The vehicle device 11 displays an alternative unlock screen G2 illustrated in FIG. 4 on the display portion 22 (A6). The vehicle device 11 displays the generated key information on the alternative unlock screen G2.

An example of the key information generation method by the key information generation portion 32 will be described. The key information generation portion 32 regularly generates the key information based on the genuine password. For example, the genuine password may be provided by a character string "ABCDEFG" of the capital alphabet. In this case, the key information generation portion 32 converts the character string constituting the genuine password into the character string "abcdefg" of the small alphabet. The key information generation portion 32 changes the arrangement of the obtained character string "abcdefg" of the small alphabet. The key information generation portion 32 shifts the characters in the character string of the small alphabet one by one to the right, and moves the rightmost character "g" to the leftmost side. With this configuration, the key information generation portion 32 generates the character string "gabcdef". The key information generation portion 32 transmits the character string "gabcdef" as the key information obtained by converting the genuine password "ABCDEFG" based on a predetermined rule.

The person in charge inputs the predetermined operation to the vehicle device 11, and informs the key information displayed on the alternative unlock screen G2 to an operator of the management device 12 using a communication means such as a telephone, or the like. The operator of the management device 12 inputs the key information to the management device 12.

When the key information is input (B1: YES), the alternative password generation portion 51 of the management device 12 generates the alternative password based on the input key information (B2). The management device 12 displays the generated alternative password on the display portion 42 (B3). The management device 12 transmits the generated alternative password to the vehicle device 11 via the communication portion 45 (B4). The vehicle device 11 receives the alternative password transmitted from the management device 12 via the communication portion 25, and stores the alternative password in the storage portion 24 (A7). The vehicle device 11 monitors whether a password is input to the alternative unlock screen G2 (A8).

The operator of the management device 12 informs the person in charge of dealer of the alternative password displayed on the display portion 42 using the communication means such as the telephone, or the like. The person in charge of dealer inputs the transmitted alternative password to the alternative unlock screen G2. When the password is input to the alternative unlock screen G2 (A8: YES), the vehicle device 11 determines whether the input password matches the alternative password stored in the storage portion 24 (A9). When the input password matches the alternative password (A9: YES), the vehicle device 11 unlocks the locked state of the vehicle device 11 (A3, corresponding to an alternative unlock processing). With this configuration, the vehicle device 11 is ready to be used by the user. When the input password does not match the alternative password (A9: NO), the vehicle device 11 proceeds to A8. The vehicle device 11 may display a message indicating that the input password does not match the alternative password on the alternative unlock screen G2.

According to the present embodiment, the key information for generating the alternative password is regularly generated based on the genuine password. For example, the power supply to the vehicle device 11 may be turned off and the key information may be cleared. In this case, even after the power supply to the vehicle device 11 is resumed, the vehicle device 11 regularly generates the key information based on the genuine password. That is, even when the key information is cleared, the same key information as the cleared key information is generated. Thus, even when the alternative password is generated based on the cleared key information, the alternative password is equivalent to the alternative password generated based on the new key information. In other words, even when the key information is cleared, the alternative password corresponding to the new key information can be substantially generated and the generated alternative password can unlock the locked state of the vehicle device 11.

Further, according to the present embodiment, instead of using the key information set as a preliminary fixed value, the generation of the key information is repeated each time the power supply to the vehicle device 11 is resumed. Thus, the configuration can urge the person in charge of dealer to contact the operator of the management device 12 each time the key information is generated. With this configuration, it is possible to avoid using the key information or the alternative password obtained in the past. Thus, the configuration can improve security.

Further, according to the present embodiment, the key information generation portion 32 generates the key information by converting the character string constituting the genuine password. Thus, the configuration can generate the key information based on the genuine password without requiring a complicated processing.

Further, according to the present embodiment, the key information generation portion 32 is included in the vehicle device 11, and the alternative password generation portion 51 is included in the management device 12. That is, the processing portion that generates the key information and the processing portion that generates the alternative password are included in remotely-arranged separate devices. With this configuration, it is possible to avoid the leakage of the key information and the alternative password at the same time. Thus, the configuration can improve the security compared with a configuration in which one device generates the key information and the alternative password.

Second Embodiment

Figure 5:
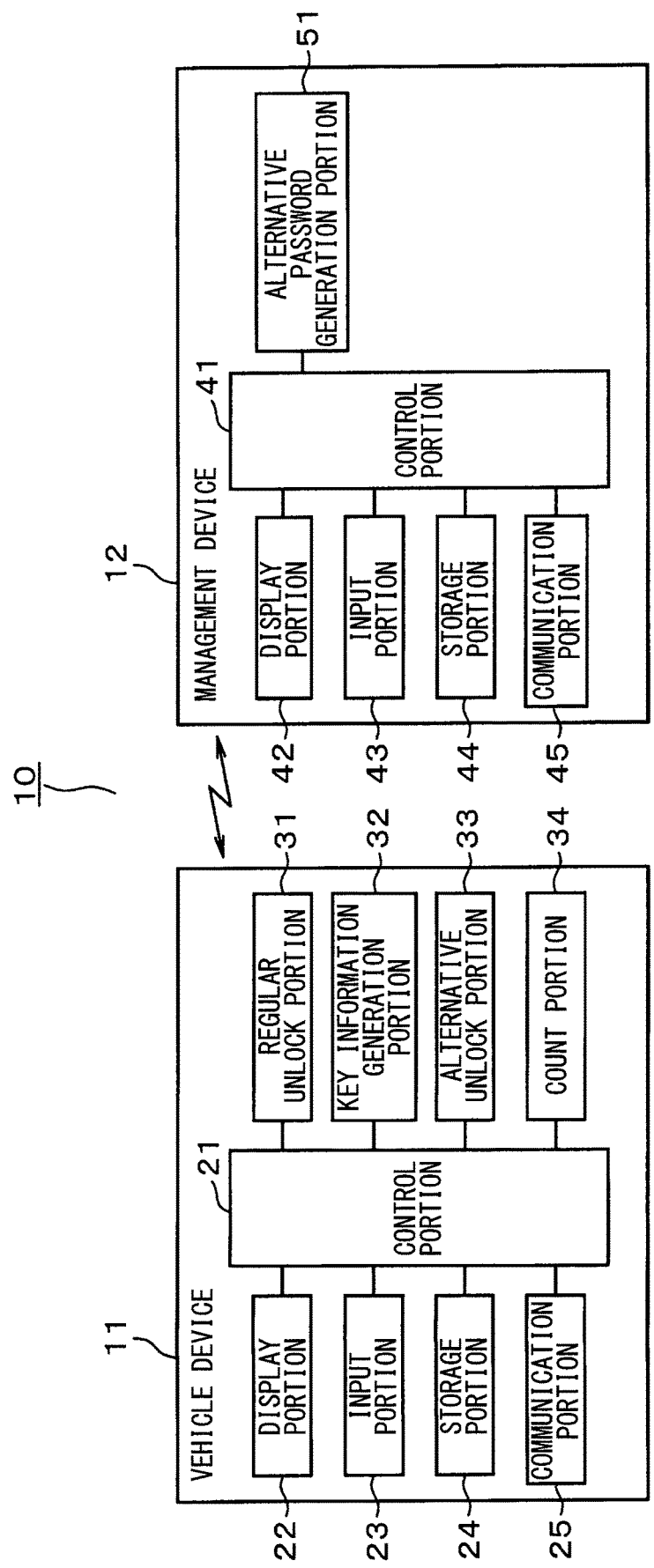
FIG. 5 is a diagram schematically showing an example configuration of a security system according to a second embodiment.

In a vehicle device 11 illustrated in FIG. 5, the control portion 21 virtually archives a count portion 34 in addition to the regular unlock portion 31, the key information generation portion 32, and the alternative unlock portion 33 with software by executing the control program. Alternatively, in the control portion 21, the count portion 34 may be achieved by hardware, or may be achieved by a combination of software and hardware.

The count portion 34 counts the number of times of the unlock of the locked state of the vehicle device 11 by the alternative password. The key information generation portion 32 generates the key information by combining the character string obtained by converting the character string constituting the genuine password and the number of times N counted by the count portion 34. That is, the key information generation portion 32 obtains the character string "gabcdef" by converting the genuine password "ABCDEFG" based on the predetermined rule. When the count number N is "0", that is, when the number of unlocking times by the alternative password is 0, the key information generation portion 32 outputs a character string "gabcdef0" as the key information. When the count number N is "1", that is, when the number of unlocking times by the alternative password is 1, the key information generation portion 32 outputs a character string "gabcdef1" as the key information.

According to the present embodiment, the generated key information and the alternative password generated based on the key information can be changed corresponding to the number of times of the unlock of the locked state of the vehicle device 11 by the alternative password. Thus, the configuration can further improve the security.

Other Embodiments

The present disclosure is not limited to the embodiments described above, and various modifications may be adopted within the scope of the present disclosure without departing from the spirit of the disclosure. For example, the connection between the vehicle device 11 and the management device 12 may be wireless communication or wired communication.

In the generation of the key information, capital letters may be converted into small letters. Alternatively, small letters may be converted into capital letters. Alternatively, the shift of the characters in the character string may be multiple units of two or more characters instead of the shift one by one. Alternatively, a part of the character string of the genuine password may be converted instead of converting all of the character string. Alternatively, the genuine password may be converted into binary numbers, and the converted character string may be shifted by bit unit. That is, as a method for generating the key information, various methods can be employed as long as the key information is regularly generated based on the genuine password.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

The invention claimed is:

1. A security system comprising:
   a vehicle device including a first processor, the vehicle device configured to be attached to a vehicle and configured to be unlocked from a locked state that limits a use of the vehicle device by inputting at least one of a preset genuine password and an alternative password; and
   a management device including a second processor, the management device configured to communicate with the vehicle device, wherein
   the first processor is configured to generate key information by converting the preset genuine password based on a predetermined rule, and wherein
   the second processor is configured to generate the alternative password based on the key information and to transmit the alternative password generated by the second processor to the first processor, and wherein
   the first processor is further configured to store the alternative password generated by the second processor in a memory and to unlock the vehicle device from the locked state when the alternative password input to the vehicle device matches the stored alternative password generated by the second processor.

2. The security system according to claim 1, wherein
   the first processor is further configured to generate the key information by converting a character string constituting the genuine password.

3. The security system according to claim 1, wherein
   the first processor is further configured to:
      count a number of times of an unlock of the locked state by the alternative password; and
      generate the key information by combining a character string constituting the genuine password with the number of times counted by the counted portion.

4. A vehicle device attached to a vehicle and configured to unlock from a locked state that limits a use of the vehicle device by inputting at least one of a preset genuine password and an alternative password, the vehicle device comprising:
   a processor configured to
      generate key information by converting the genuine password based on a predetermined rule,
      receive the alternative password generated by a management device based on the key information, the management device transmitting the alternative password to the vehicle device,
      store the alternative password generated and transmitted by the management device, and
      unlock the vehicle device from the locked state when the stored alternative password generated and transmitted by the management device matches the alternative password input to the vehicle device.

5. A computer-readable non-transitory storage medium storing a security program, the security program comprising instructions executed by a processor of a vehicle device attached to a vehicle for unlocking the vehicle device from a locked state that limits a use of the vehicle device by inputting at least one of a preset genuine password and an alternative password, the instructions comprising:
   generating key information by converting the genuine password based on a predetermined rule;
   receiving the alternative password generated by a management device based on the key information, the management device transmitting the alternative password to the vehicle device;
   storing the alternative password generated and transmitted by the management device; and
   unlocking the vehicle device from the locked state when the stored alternative password generated and transmitted by the management device matches the alternative password input to the vehicle device.

* * * * *